Aug. 31, 1965  H. SABET  3,203,405
ROTARY ENGINE
Filed Jan. 30, 1962  5 Sheets-Sheet 1
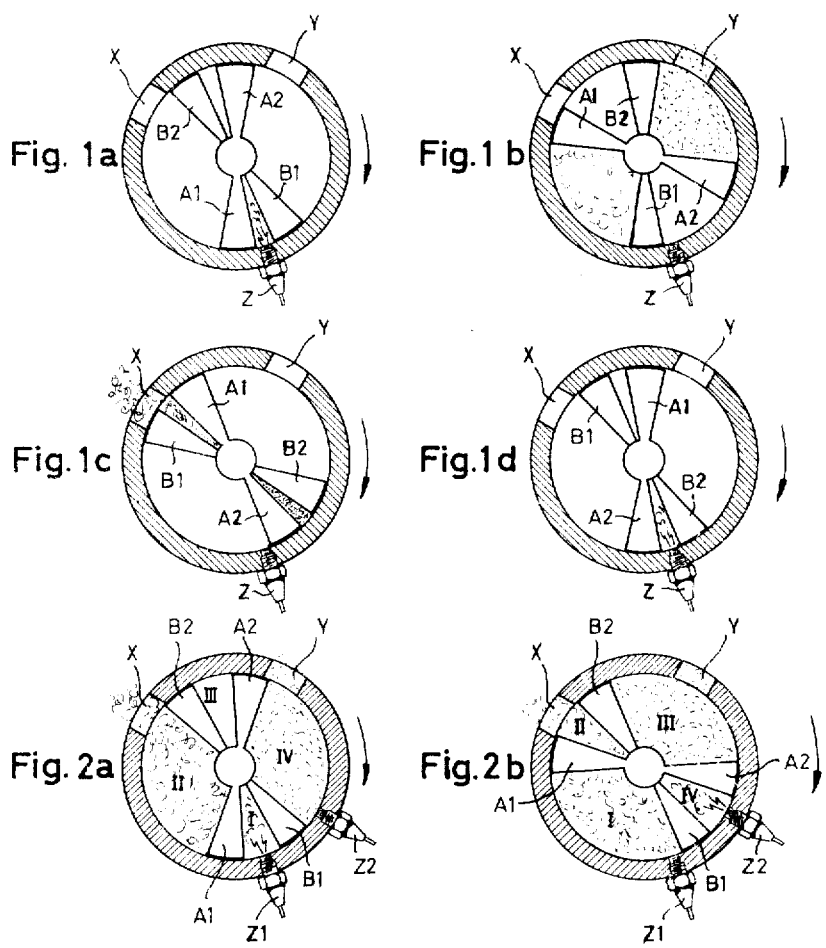
INVENTOR
Huschang Sabet
BY George H. Spencer
ATTORNEY Aug. 31, 1965     H. SABET     3,203,405
ROTARY ENGINE
Filed Jan. 30, 1962     5 Sheets-Sheet 2
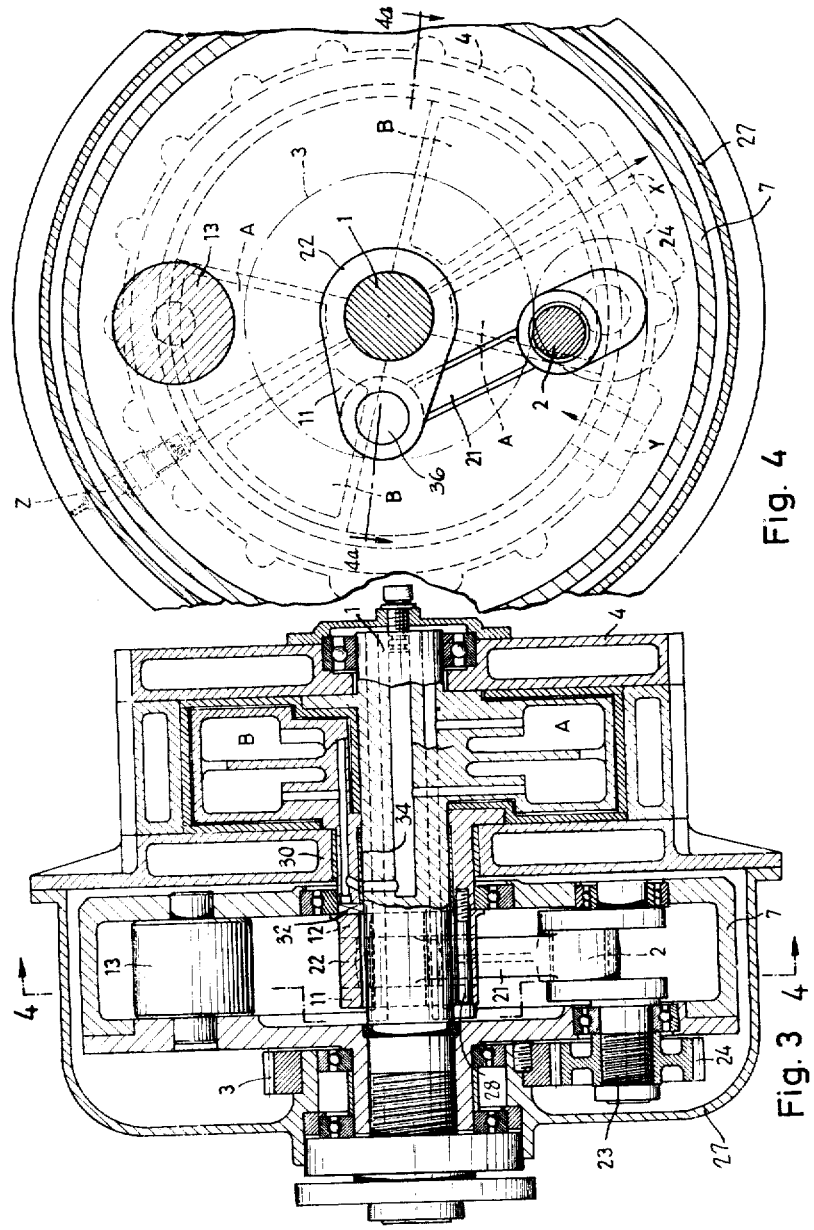
INVENTOR
Huschang Sabet
BY *George H. Spencer*
ATTORNEY United States Patent Office 3,203,405
Patented Aug. 31, 1965

3,203,405
ROTARY ENGINE
Huschang Sabet, Eduard-Pfeiffer-Strasse 52,
Stuttgart, Germany
Filed Jan. 30, 1962, Ser. No. 169,779
Claims priority, application Germany, Feb. 3, 1961,
S 72,636; Dec. 14, 1961, S 77,140
9 Claims. (Cl. 123—11)

The present invention relates generally to the internal combustion engine art, and, more particularly, to engines having rotary pistons. The invention is especially concerned with the type having double rotating wings or vanes revolving in a cylindrical housing and about the axis thereof. These vanes partition the inner space thereof into individual chambers which are divided in axial planes, and ignition plugs, such as of the spark or glow type, are disposed in the cylinder wall, as well as injection nozzles or inlets for the fuel, inlets for air, and outlets for the burned gases.

Rotary piston motors are known wherein the velocity of revolution of the partition wall rotating with nonuniform velocity is controlled by the partition wall which rotates with substantially uniform velocity by means of a gear and preferably a crank gear.

The main object of the present invention is to provide an improvement in rotary piston engines.

Another object is to provide a rotary piston engine which has at least two power impulses for each revolution thereof.

Another object of this invention is to simplify and reduce the expense of rotary piston engines.

These objects and others ancillary thereto are accomplished according to preferred embodiments of the invention wherein the control of the partition wall which rotates with nonuniform velocity is performed in such a manner that, after ignition has taken place, the chamber which is bounded by two rotating vanes and filled with compressed fuel mixture, increases due to the fact that one of the vanes lags behind the other rotating vane. As soon as the forwardmost rotating vane has reached the outlet, this chamber decreases due to the advance of the rearwardmost rotating vane. At the same time the first-mentioned chamber increases, so does another chamber which is situated opposite or in a mirror image position relative to the axis of rotation, and a fuel mixture of fuel and air is drawn in, or fuel is injected into this chamber, which, during the increase of the chamber, is compressed. In this manner, two power impulses may be exerted upon the rotating system during one revolution.

The control of these two double rotating vanes may also be performed in such a manner whereby after each revolution of the rotating system by 90°, a chamber which is filled with compressed fuel mixture is in the ignition position so that four power impulses may be exerted upon the rotating system during one revolution thereof. Such an operation of the engine according to the invention may be accomplished by providing two spark plugs in the housing wall which are spaced a small angular distance from each other.

The two rotating vanes are mechanically controlled so that at the moment of ignition, there is "flyback suppression" acting upon the rearwardmost vane of an explosion chamber which flyback suppression may be effected by means of a crank gear. This flyback suppression simply prevents the rearwardmost vane from being forced to move in a reverse direction as would otherwise occur due to the ignition and rapid burning of the fuel mixture. Furthermore, the control of the rotating vanes must assure that at each moment one rotating vane is disposed between the inlet and outlet openings in the cylinder housing wall.

The control may be done in a simple and efficient manner by providing a rotating disk revolving with the operating shaft and in which two revolving shafts are supported. On each of these revolving shafts a pinion is arranged which meshes with a stationary gear, which is stationary relative to the housing. An elliptical gear is also arranged on each revolving shaft and meshes with an elliptical gear of the same size which is disposed on the hollow shaft but is offset or staggered by 90°. Preferably, the stationary gear with which the two planet pinions mesh, is a gear rim attached to the housing. The gear rim is preferably adjustably mounted to the housing so as to provide for variable adjustment of the piston rotating with nonuniform velocity relative to the piston rotating with uniform velocity.

The rotating disk preferably has a box-like cross section having a side or radial wall which is supported on the hollow shaft by a support ball bearing. Recesses are provided in the circumferential cylindircal wall of the rotating disk in order to make it possible to retain the diameter of the rotating disk comparatively small, while permitting movement of the longer portions of the elliptical gears.

Additional objects and advantages of the present invention will become apparent upon consideration of the following description when taken in conjunction with the acompanying drawings in which:

FIGURES 1a, 1b, 1c, and 1d are diagrammatic views of the rotary cylinder of the engine and indicate the mode of operation using two impulses.

FIGURES 2a and 2b are diagrammatic views illustrating the rotary cylinder in an engine having a four impulse operation.

FIGURE 3 is a sectional view through the combustion chambers of the present invention taken substantially perpendicularly to the plane of rotation of the engine.

FIGURE 4 is a vertical sectional view taken substantially along the plane defined by reference line 4—4 of FIGURE 3.

Figure 4A:
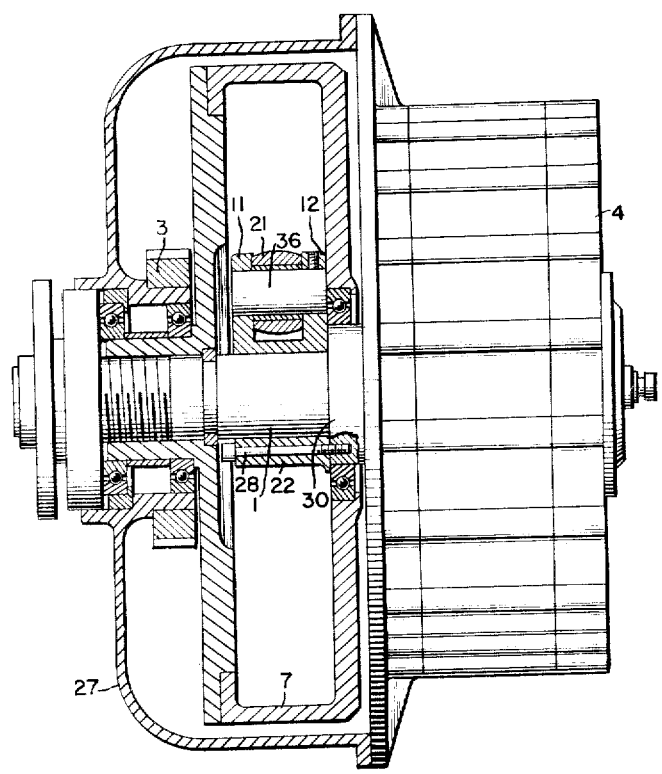
FIGURE 4a is a sectional view taken substantially along the plane defined by reference line 4a—4a in FIGURE 4.

With more particular reference to the drawings, FIGURE 1a illustrates the two partition walls A and B which define the vanes $A_1$, $A_2$, and $B_1$, $B_2$, and which are disposed in such an angular position that a small chamber or chamber sector is formed by partition walls or vanes $A_1$ and $B_1$. This small chamber is located adjacent spark plug Z. The rotating vanes $A_2$ and $B_2$ touch the inner wall of the housing in the section disposed between outlet X for combustion gas and inlet Y for the fuel and air mixture.

After ignition has taken place, the expanding combustion gases drive the vane $A_1$ into the position shown in FIGURE 1b. During this time, the vane $B_1$ has advanced a small distance angularly. Simultaneously, a new fuel mixture is drawn into the chamber bounded by vanes $A_2$ and $B_2$. Now, when the vane $A_1$ uniformly advances clockwise and is followed by the vane $B_1$, which latter is accelerated due to a crank gear arrangement, the burned combustion gases are ejected through outlet X, as indicated in FIGURE 1c. At the same time, the fuel mixture in the chamber between vanes $A_2$ and $B_2$ is compressed so that as the two vanes advance at an approximately equal angular velocity, they will attain the position indicated in FIGURE 1d at which point ignition may again take place.

Another mode of operation is indicated in the drawings of FIGURE 2 wherein the fuel mixture is additionally ignited in those combustion chambers which are defined on the front sides of the vanes viewed in the direction of rotation of the vanes $B_1$ or $B_2$, and on the rear sides of the vanes $A_2$ or $A_1$, and this is done by means of a second spark plug $Z_2$. FIGURE 2a indicates the position at the moment of ignition by means of spark plug $Z_1$, while FIGURE 2b indicates the position of the vanes when ignition is caused by spark plug $Z_2$. The outlet X and the inlet Y are substantially at the same points as in the embodiment indicated in the drawings of FIGURE 1.

Although the terms "spark plug" and "ignition plug" are used, these terms also include plugs of the type which cause ignition without sparking, such as glow plugs.

Between the outlet X and the spark plug Z, a further outlet may be provided which is not vented directly with the atmosphere, but e.g. connected with a gas turbine serving to drive additional aggregates.

With more particular reference to FIGURES 3 and 4, the vane A is rigidly connected with the operating shaft 1. Two arms 11 and 12 are rotatably arranged on shaft 1. The crank shaft 2 is supported by a hollow disk 7 mounted on operating shaft 1. A connecting rod 21 is connected to the crank shaft 2 and with a sleeve 22 which is rotatably accommodated on shaft 1 (and a clearance is shown exaggerated in FIGURE 3) and rigidly connected with vane B via a hollow shaft 30 which is integral with vane B and non-rotatably connected with sleeve 22 by means of a key 32. Shaft 30 is rotatably mounted on shaft 1 by means of bearings 34. As can be seen more clearly in FIGURE 4a, sleeve 22 is rotatably mounted on shaft 1 and is held to hollow shaft 30 by means of screw 28. A counterbalancing weight 13 is arranged in alignment with arms 11 and 12 on the side of the flywheel opposite crank 2 and is mounted on disk 7. Balancing of the mass may also be effected by a crank gear arranged symmetrically with respect to the operating shaft. The pin 23 projects beyond the disk 7 and is connected at one end with the crank shaft 2 and, at its outer end, carries a planet gear 24 which engages a stationary gear 3 which encircles shaft 1. Stationary gear 3 is fixed to housing 27 which encloses the control means.

Shaft 1 is designed to be hollow, in a known manner, and the hollow space thereof communicates with interior chambers of vane A. Further communication of the hollow chamber of shaft 1 is provided with the inner chambers of vane B. The wall of the combustion housing 4 may also be designed to have chambers therein and a cooling agent may flow through these chambers for cooling purposes, as is well known in this art. The surfaces of the vanes may, if desired, be designed as curved surfaces.

In this embodiment the assembly of elements mounted to disk 7 may be considered the means for providing flyback suppression, and it may be noted from the position of the elements indicated in FIGURE 4, which is the ignition or power impulse position, that this crank gear arrangement will provide the desired suppression.

Figure 5:
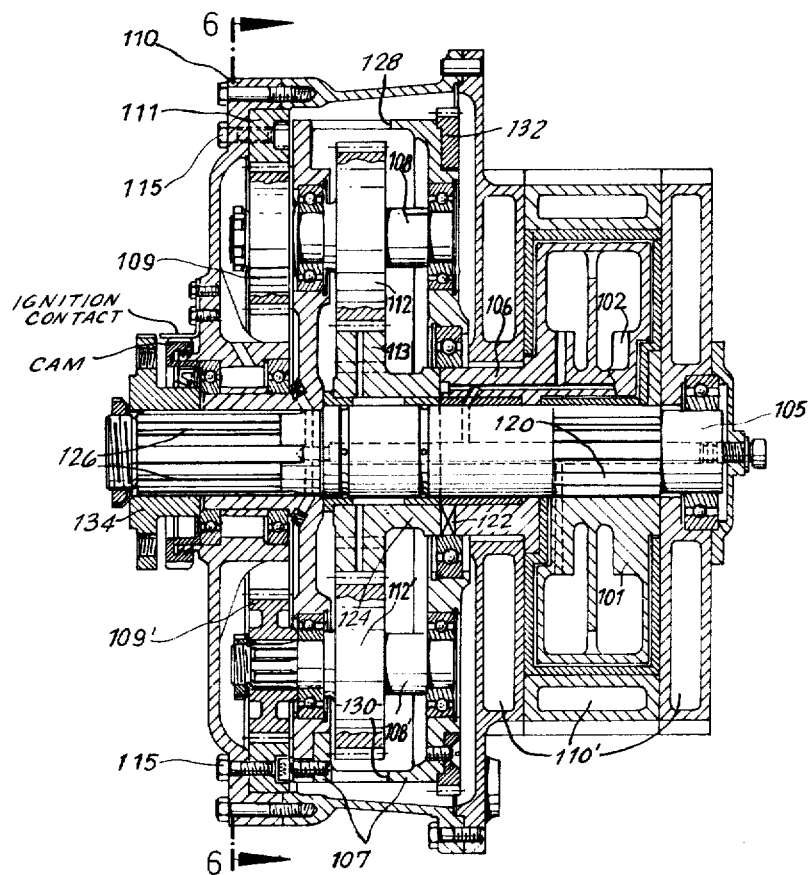
FIGURE 5 is a cross sectional view taken through the cylinder or piston chamber and the gearing arrangement, with the section line being taken in two different planes above and below the shaft.
Figure 6:
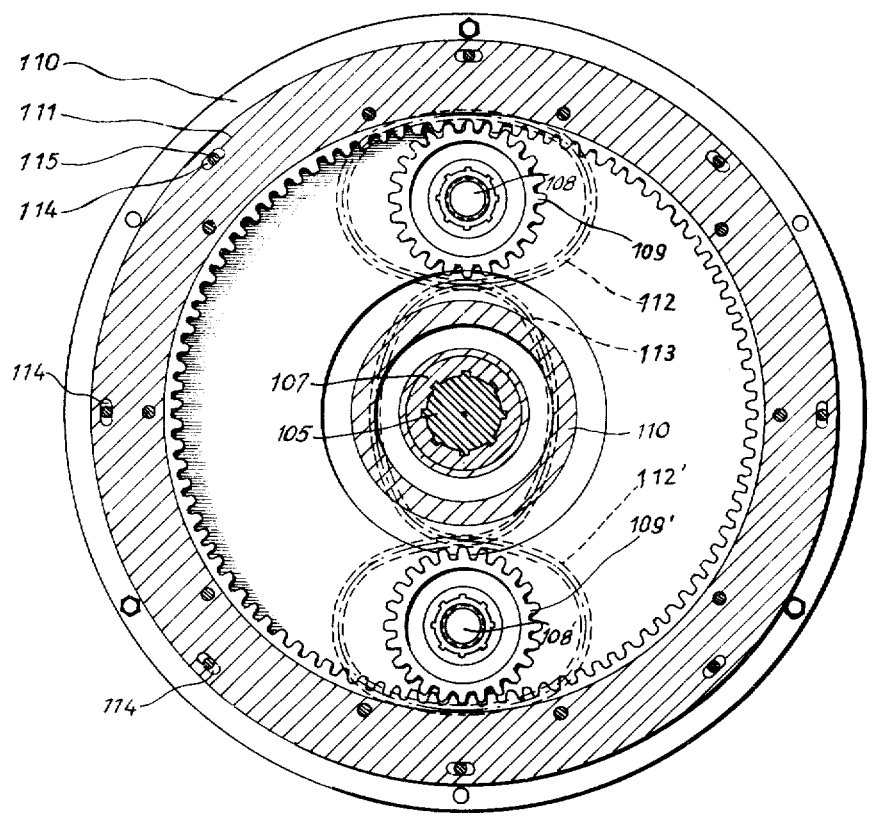
FIGURE 6 is a vertical sectional view taken substantially along the plane defined by reference line 6—6 of FIGURE 5.

The embodiment shown in FIGURES 5 and 6 provides four combustion chambers which are defined by the pair of pistons or vanes 101 and 102. The combustion chambers having the fuel mixture therein are successively ignited alternately by the spark plugs which are provided for this purpose. One piston pair 101 is non-rotatably arranged on the operating shaft 105 by means of keys 120, while the other piston pair 102 is arranged on a hollow shaft 106 which is connected with a hub 124 by means of a key 122. Hub 124 is integral with elliptical gear 113.

A box-like hollow rotating disk 107 rotates with the operating shaft because it is non-rotatably connected thereto by keys 126 and has two revolving shafts 108 and 108' supported thereon. Two planet pinions 109 and 109' are supported on these two revolving shafts and they mesh with a gear rim 111 arranged on housing 110. Elliptical gears 112 and 112' are arranged interiorly of rotating disk 107 and on each of the revolving shafts 108 and 108', respectively. These elliptical gears engage a centrally located elliptical gear 113 provided on the hollow shaft and which is staggered by 90° with respect to the elliptical gears 112 and 112'. In order to render it possible to vary or adjust the one piston pair relative to the other, the gear rim 111 is adjustably mounted on the housing 110 for which purpose set screws 115 are provided. These set screws 115 fix the gear rim to the housing, and they engage arcuate slots 114 in the housing.

Gear 132 is provided on the flywheel. There is a power take off flange 134 provided on shaft 1. A cooling jacket 110' is shown surrounding the piston assembly.

In order to allow the elliptical gears 112 and 112' to pass through the flywheel 104 when they rotate, the flywheel has openings 128 and 130 which are adjacent to the elliptical gears.

The cylinder chamber of the device may be a non-cylindrical solid of revolution, e.g. a chamber having the shape of an ellipsoid of revolution or a sphere.

It will be understood that the above description of the present invention is susceptible to various modifications, changes, and adaptations, and the same are intended to be comprehended within the meaning and range of equivalents of the appended claims.

What is claimed is:

1. A rotary piston engine, comprising, in combination:
   (a) a housing defining a chamber and having an inlet for the entrance of fuel mixture and an outlet for the discharge of combustion gases;
   (b) at least one igniter arranged in the wall of said housing and communicating with the interior thereof;
   (c) an operating shaft rotatably mounted coaxially with and extending through said housing;
   (d) a pair of pistons diametrically arranged on opposite sides of, and rigidly connected to said shaft;
   (e) a hollow shaft disposed about said operating shaft and extending coaxially with and through said housing, said hollow shaft being rotatable relative to said operating shaft and said housing;
   (f) a second pair of pistons diametrically arranged on opposite sides of, and rigidly connected to said hollow shaft;
   (g) said pistons of said first and second pairs being interdigitated and being in sealing engagement with said housing thereby dividing said chamber into four chamber sectors; and
   (h) means interconnected between said vanes for controlling them so that one of said vanes revolves with nonuniform velocity, and, during one revolution, each of the four chamber sectors bounded by two vanes increases in size twice due to the advance of one of the vanes with respect to the other and decreases in size twice due to the advance of said other vane with respect to said one vane, said control means including
       (1) a disk rotating with the operating shaft of the device;
       (2) two revolving shafts arranged symmetrically with respect to the operating shaft and carried by said disk;
       (3) a pinion on each of said revolving shafts,
       (4) a stationary gear mounted to the housing and engaging said pinions on said revolving shafts;
       (5) an elliptical gear on each of said revolving shafts, and
       (6) a centrally located elliptical gear meshing with said two elliptical gears and fixed on said hollow shaft and staggered from said two elliptical gears by 90°.

2. An engine as defined in claim 1 wherein said igniter is a single ignition plug and is arranged in the housing at one of the two points at which the chamber sector bounded by two pairs of rotating pistons is the smallest, said inlet and outlet being so located in the housing that due to the decrease in size of one of the two chamber sectors located in a mirror image position relative to the axis of rotation, the combustion gases are discharged through said outlet, and by the decrease in size of the other chamber sector, the fuel drawn into the chamber through said inlet is compressed.

3. In a rotary piston engine, the combination comprising:
   (a) a housing defining a chamber;
   (b) an operating shaft rotatably mounted in said housing;
   (c) a first pair of pistons diametrically arranged on opposite sides of and rigidly connected to said shaft;
   (d) a second shaft mounted coaxially with said operating shaft for rotation relative to said operating shaft and said housing;
   (e) a second pair of pistons diametrically arranged on opposite sides of and rigidly connected to said second shaft;
   (f) said pistons of said first and second pairs being interdigitated and being in sealing engagement with said housing thereby dividing said chamber into four chamber sectors; and
   (g) control means connected to said shafts and thus said pistons for rotating one pair of pistons at a uniform angular velocity and the other pair of pistons at a nonuniform velocity and controlling said pistons so that during one revolution each of the four chamber sectors increases in size twice due to the advance of one pair of pistons with respect to the other and decreases twice due to the advance of the other pair of pistons with respect to the one pair, said control means including
      (1) a flywheel connected to rotate at a uniform angular speed with said operating shaft;
      (2) an elliptical gear rotatably mounted on the operating shaft and rotatable relative thereto and connected to rotate with said second pair of pistons;
      (3) at least one rotating shaft rotatably mounted in and rotatable relative to said flywheel, and said rotating shaft being eccentric to the operating shaft;
      (4) a planet pinion fixed to said rotating shaft,
      (5) a gear rim mounted to the housing to be stationary and meshing with said planet pinion, and
      (6) a planet elliptical pinion meshing with said elliptical gear and having its major axis displaced by 90° with respect to the major axis of the elliptical pinion, said elliptical planet pinion being fixed to the rotating shaft.

4. The combination as defined in claim 3 wherein there are two rotating shafts, planet pinions, and elliptical pinions on the flywheel which are symmetrically mounted with respect to the operating shaft.

5. An engine as defined in claim 4 wherein said stationary gear is a gear rim surrounding said pinions.

6. An engine as defined in claim 5 comprising means for adjustably mounting the gear rim to the housing.

7. An engine as defined in claim 6 wherein said means for adjustably mounting said gear rim includes arcuate slots provided in the housing, set screws extending through said slots and threadedly engaging said gear rim.

8. An engine as defined in claim 4 wherein said flywheel is box-like in cross section and houses the elliptical pinions between the two radial side walls thereof.

9. An engine as defined in claim 8 wherein recesses are provided in the circumferential cylindrical wall of the flywheel immediately adjacent said elliptical pinions to provide for movement of the longer portion of the elliptical pinions outwardly of the flywheel.

References Cited by the Examiner

UNITED STATES PATENTS

| | | | |
|---|---|---|---|
| 903,470 | 11/08 | Hoell | 123—11 |
| 1,299,588 | 4/19 | Luikart | 123—11 |
| 1,256,647 | 2/18 | Baudot | 123—11 |
| 1,579,207 | 4/26 | Bullington | 123—11 |
| 2,046,989 | 7/37 | Winter | 123—11 |

FOREIGN PATENTS 374,632  6/32  Great Britain.

KARL J. ALBRECHT, *Primary Examiner.*

RALPH H. BRAUNER, JOSEPH H. BRANSON, Jr., *Examiners.*

UNITED STATES PATENT OFFICE
CERTIFICATE OF CORRECTION

Patent No. 3,203,405 August 31, 1965

Huschang Sabet

It is hereby certified that error appears in the above numbered patent requiring correction and that the said Letters Patent should read as corrected below.

In the heading to the printed specification, line 7, for "S 72,636" read -- S 72,363 --.

Signed and sealed this 8th day of March 1966.

(SEAL)

Attest:

ERNEST W. SWIDER
Attesting Officer

EDWARD J. BRENNER
Commissioner of Patents